(12) United States Patent
Marx et al.

(10) Patent No.: US 12,570,257 B2
(45) Date of Patent: Mar. 10, 2026

(54) BRAKING SYSTEM FOR A VEHICLE

(71) Applicant: ZF Active Safety GmbH, Koblenz (DE)

(72) Inventors: Andreas Marx, Hartenfels (DE); Nicholas Alford, Waldesch (DE)

(73) Assignee: ZF Active Safety GmbH, Koblenz (DE)

( * ) Notice: Subject to any disclaimer, the term of this patent is extended or adjusted under 35 U.S.C. 154(b) by 728 days.

(21) Appl. No.: 17/727,281

(22) Filed: Apr. 22, 2022

(65) Prior Publication Data

US 2022/0340114 A1 Oct. 27, 2022

(30) Foreign Application Priority Data

Apr. 23, 2021 (DE) .......................... 102021110474.2

(51) Int. Cl.
*B60T 8/88* (2006.01)
*B60T 17/22* (2006.01)

(52) U.S. Cl.
CPC .............. *B60T 8/885* (2013.01); *B60T 17/22* (2013.01); *B60T 2240/00* (2013.01); *B60T 2250/03* (2013.01); *B60T 2270/402* (2013.01); *B60T 2270/404* (2013.01); *B60T 2270/414* (2013.01); *B60T 2270/82* (2013.01)

(58) Field of Classification Search
None
See application file for complete search history.

(56) References Cited

FOREIGN PATENT DOCUMENTS

| | | | | | |
|---|---|---|---|---|---|
| CA | 2585040 | A1 | * | 11/2007 | ........... H04L 12/423 |
| DE | 102017119431 | A1 | | 3/2018 | |
| EP | 3626571 | A1 | * | 3/2020 | ........ B60R 16/0231 |
| JP | 2000225935 | A | * | 8/2000 | ........... B60T 13/741 |
| WO | WO-2020260050 | A1 | * | 12/2020 | ............... G05B 9/03 |

OTHER PUBLICATIONS

JP2000225935A—English Machine translation (Year: 2000).*

* cited by examiner

*Primary Examiner* — Melanie Torres Williams
(74) *Attorney, Agent, or Firm* — Kristin L. Murphy

(57) ABSTRACT

The disclosure relates to a braking system for a vehicle having at least four brakable wheels, comprising at least four brake actuator units, each of which can be associated with one of the wheels of the vehicle, wherein each brake actuator unit is associated with an electronic control unit which is designed to activate the brake actuator unit in order to apply a braking force to an associated wheel. At least two of the control units are designed as a master unit and a brake signal from a brake actuation unit is sent directly to each of the master units, and wherein each master unit is directly connected in terms of signaling to at least another of the control units, designed as a slave unit, in order to forward the brake signal to the slave unit.

18 Claims, 1 Drawing Sheet

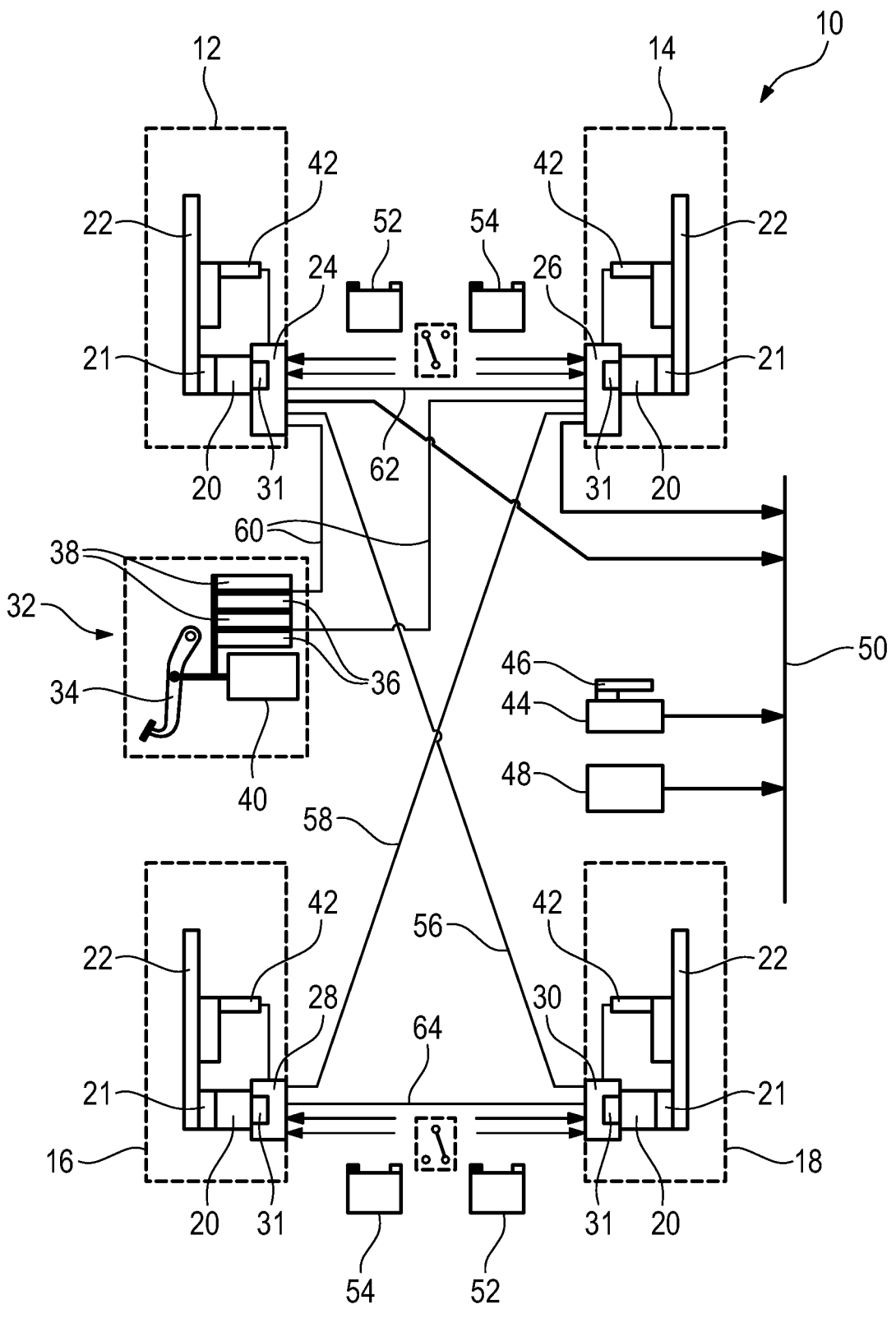

BRAKING SYSTEM FOR A VEHICLE

CROSS-REFERENCE TO RELATED APPLICATION

This application claims priority to German Priority Application No. 102021110474.2, filed Apr. 23, 2021, the disclosure of which is incorporated herein by reference in its entirety.

TECHNICAL FIELD

The disclosure relates to a braking system for a vehicle having at least four brakable wheels.

BACKGROUND

In modern vehicles, the individual wheels are each associated with a brake actuator unit having an electromechanical brake actuator. Such braking systems are also referred to as "brake-by-wire" systems.

In such systems, a brake pedal is used to simply take a braking request from a driver of the vehicle. On the basis of this braking request, the individual brake actuator units are then activated by one or more electronic control units. There is no mechanical connection between the brake pedal and the brake actuator units.

Since a braking system is a safety-relevant device of a vehicle, usually at least certain components or functions are designed redundantly within the braking system so that the braking system can work reliably even if a malfunction or a defect occurs. In other words, redundancies are provided within a braking system in order to achieve a high level of operational reliability.

In previous "brake-by-wire" systems, an additional hydraulic braking device is provided as a fallback, for example.

However, this is associated with a lot of effort and high costs. Furthermore, additional installation space is required and the weight of the vehicle is increased.

SUMMARY

What is needed is an optimized braking system that has a particularly high level of operational reliability.

According to the disclosure, a braking system for a vehicle having at least four brakable wheels is disclosed, comprising at least four brake actuator units, each of which can be associated with one of the wheels of the vehicle, with each brake actuator unit being associated with an electronic control unit which is designed to activate the brake actuator unit in order to apply a braking force to an associated wheel. At least two of the control units are designed as a master unit and a brake signal from a brake actuation unit is sent directly to each of the master units, with each master unit being directly connected in terms of signaling to at least another of the control units, designed as a slave unit, in order to forward the brake signal to the slave unit.

The fact that two master units are present, each of which receives a brake signal directly from the brake actuation unit, ensures that the brake signal can be transmitted even if one of the control units designed as master units fails and a braking process can be initiated if necessary. Because the master units are each directly connected in terms of signaling to at least another control unit designed as a slave unit, at least one further wheel can be braked so that sufficient deceleration of the vehicle is achieved even if one control unit fails.

In one exemplary arrangement, the control units designed as a slave unit do not receive the brake signal directly from the brake actuation unit, but rather from one of the master units.

In this context, "master" and "slave" mean that the master units are hierarchically superior to the slave units and can give them instructions. The slave units can receive a brake signal from the master units. The reverse is not intended.

Such a braking system is advantageous in that it is designed to be "fail-safe" without the need for an additional mechanical or hydraulic braking device. The braking system according to the disclosure thus requires little installation space and is also particularly cost-effective, while at the same time ensuring a high level of operational reliability.

"Fail-safe" in this context means that, in the event of any single failure of a component of the braking system, a minimum braking performance of the system is maintained.

In the present case, in the event of a single failure, for example if one of the brake actuator units fails, a minimum braking power of approximately 70% of the brake line of the non-disrupted braking system would still be maintained.

Non-disrupted operation is when all components of the braking system are working properly.

Each of the brake actuator units comprises an electromechanical brake actuator. In one exemplary arrangement, each of the brake actuator units comprises an electric motor and a spindle drive by which the brake can be actuated.

The brake actuator units are in dry brakes, i.e. they are not driven hydraulically.

In one exemplary arrangement, the brake actuation unit comprises a brake pedal that can be actuated by a driver of the motor vehicle with their foot in order to generate a brake signal.

According to one exemplary arrangement, the two control units designed as a slave unit are directly interconnected in terms of signaling, in particular via a signal line. The slave units can thus communicate with one another. If, due to a failure of one of the control units designed as a master unit, a slave unit does not receive a brake signal from the master unit, this slave unit can consequently receive the brake signal from another slave unit. Thus, if one master unit fails, the brake signal can be sent to the other control units, and so good braking behavior can be achieved even if one master unit fails.

In one exemplary arrangement, the two control units designed as a master unit are directly interconnected in terms of signaling, such as, for example, via a signal line. As a result, the control units designed as a master unit can communicate with one another and coordinate a brake signal. It is thus possible to generate the same brake pressure on the wheels with which the master units are associated. This allows the vehicle to be kept particularly stable during a braking maneuver.

In the case of communication between the at least two control units designed as a master unit, one of the master units is designed to act as a higher-level master. In this way, it can be clearly determined which braking force is to be generated on the wheels.

The control units designed as a master unit can each be connected in terms of signaling to the brake actuation unit by a separate signal line. The use of separate signal lines ensures reliable signal transmission. In particular, the brake signal can be transmitted even if one signal line fails. This provides additional safety.

Since the two master units can communicate with one another, if one signal line fails, the brake signal can be transmitted from one master unit to the other master unit. Consequently, a failure of one of the signal lines has no negative effects on the braking performance of the braking system.

In one exemplary arrangement, at least two sensors via which a brake actuation can be detected are provided on the brake actuation unit, and each of the sensors is directly connected in terms of signaling to a master unit. The sensors can be used to determine a driver's braking request, which is transmitted to the control units in the form of a brake signal.

The sensors can be a force sensor and a displacement sensor. Operation of a force sensor and a displacement sensor, what force and how far the brake pedal is depressed by a driver in order to determine a braking request from the driver.

According to one exemplary arrangement, each of the wheels is associated with a rotational speed sensor which is connected to the control unit associated with the relevant wheel. A current vehicle speed can be determined on the basis of the detected rotational speed. The current vehicle speed can in turn be used to determine a necessary braking force on the basis of a braking request from the driver.

Each of the control units can comprise control electronics for activating the associated brake actuator unit, with at least one of the control units being able to access the control electronics of at least one further control unit. This ensures additional redundancy of the braking system and thus a particularly high level of operational reliability. In one exemplary arrangement, a brake actuator unit can be activated by a control unit other than the associated control unit if a fault in the associated control unit does not affect the control electronics.

In one exemplary arrangement, the braking system comprises a bus system, and the at least two control units designed as a master unit are connected to the bus system. In this way, the master units can receive signals from the bus system.

For example, the braking system comprises an electronic parking brake which has a parking brake actuation unit and is connected to the bus system. The master units can thus receive a signal when a user actuates the parking brake and activate the brake actuator units accordingly.

Furthermore, a yaw rate sensor can be connected to the bus system. The yaw rate sensor can determine a vehicle-dynamics-related state of the vehicle, for example, whether the vehicle tends to turn about its vertical axis. Since the yaw rate sensor is connected to the bus system, information about the vehicle's tendency to turn about its vertical axis can be forwarded to the master units. The master units can then activate the brake actuator units in such a way that a possible tendency for the vehicle to turn can be compensated for.

According to one exemplary arrangement, the braking system has a first power supply unit and a second power supply unit, and the power supply units can be switched on independently of one another in order to supply all the control units and brake actuator units with power. Since two power supply units are provided, the power supply is also designed to be redundant.

For example, a first subset of the brake actuator units is coupled to the first power supply unit for the supply of power and a second subset of the brake actuator units is coupled to the second power supply unit for the supply of power, and in one exemplary arrangement, the first subset and the second subset are free of intersections. More precisely, the first power supply unit supplies two control units and the second power supply unit supplies the other control units.

In one exemplary arrangement, the power supply units are connected diagonally in the vehicle. This means that the first power supply unit supplies two control units located diagonally in the vehicle with respect to the center of the vehicle and the second power supply unit supplies the two further control units located diagonally with respect to the center of the vehicle.

If one power supply unit fails, the other power supply unit can take over the supply of all the brake actuator units.

For example, the master units are associated with the front wheels, which have a higher braking load, and are each directly coupled to the control unit of the rear wheel located diagonally with respect to the center of the vehicle. In this way, if one master unit fails, a braking behavior in which the vehicle can be controlled in a stable manner can be achieved.

According to one exemplary arrangement, the signaling circuitry is designed such that each master unit can communicate in terms of signaling with the other control units if the other master unit fails. In this way, a brake signal can be forwarded to the control units that are still functioning quickly. In this case, the master units are connected directly in terms of signaling to each of the control units designed as a slave unit.

Further advantages and features of the disclosure will become apparent from the following description and the accompanying single drawing, to which reference is made. This schematically shows a braking system according to the disclosure for a vehicle.

BRIEF DESCRIPTION OF DRAWINGS

FIG. 1 shows a braking system 10 for a vehicle having four brakable wheels 12, 14, 16, 18. In particular, the vehicle has two front wheels and two rear wheels.

DETAILED DESCRIPTION

A brake actuator unit 20 is associated with each of the wheels 12, 14, 16, 18.

The brake actuator units 20 each comprise an electromechanical actuator having an electric motor and a spindle drive, which is not shown in the FIGURE for the sake of simplicity, A hydraulic actuator is not provided.

By operation of the brake actuator units 20, a brake shoe 21 associated with each wheel 12, 14, 16, 18 can be moved and pressed against a brake disk 22 to brake the vehicle.

Each brake actuator unit 20 is also associated with an electronic control unit 24, 26, 28, 30.

The control units 24, 26, 28, 30 are designed to activate the brake actuator units 20 in order to apply a braking force to an associated wheel 12, 14, 16, 18.

For this purpose, each of the control units 24, 26, 28, 30 comprises control electronics 31 for activating the associated brake actuator unit 20.

The brake actuator units 20 are activated when a corresponding brake signal is transmitted to the control units 24, 26, 28, 30.

In order to be able to generate a brake signal, the braking system comprises a brake actuation unit 32 comprising a brake pedal 34. The brake signal is generated by a driver pressing the brake pedal 34 of the brake actuation unit 32 with their foot and thus signaling their braking request.

In the exemplary arrangement shown, the brake actuation unit 32 comprises four sensors, in particular two force sensors 36 and two displacement sensors 38, which can detect a brake actuation. The force sensors 36 and the displacement sensors 38 are each directly connected in terms of signaling to one of the master units.

In principle, a single force sensor 36 and a single displacement sensor 38 would be sufficient. By providing two sensors in each case, the safety of the braking system 10 is increased, since a brake signal can still be generated and forwarded even if one sensor fails.

The brake actuation unit 32 also comprises a braking force simulator 40. This generates a counter pressure which counteracts the pressure exerted on the brake pedal 34 by the driver.

Furthermore, a rotational speed sensor 42 is associated with each wheel 12, 14, 16, 18 in order to detect a rotational speed of the wheels 12, 14, 16, 18.

The rotational speed sensors 42 are each connected to the control unit 24, 26, 28, 30 associated with the corresponding wheel 12, 14, 16, 18.

The braking system 10 further comprises a parking brake 44 having a parking brake actuation unit 46 which can be actuated by a driver to trigger the parking brake.

A yaw rate sensor 48 is also provided.

The braking system has a bus system 50, and the parking brake 44 and the yaw rate sensor 48 are connected to the bus system 50.

The two control units 24, 26 designed as a master unit are also connected to the bus system 50 and can receive information from them, for example regarding an actuation of the parking brake 44 or a vehicle-dynamics-related state of the vehicle determined by the yaw rate sensor 48.

Furthermore, the braking system 10 has a first power supply unit 52 and a second power supply unit 54, and the power supply units 52, 54 can be switched on independently of one another.

The power supply units 52, 54 are designed to supply all the control units 24, 26, 28, 30 and brake actuator units 20 with power.

In the non-disrupted operation, the first power supply unit 52 supplies power to the control unit 24, 26 associated with a front wheel and the corresponding brake actuator unit 20 as well as to the control unit 28, 30 associated with a rear wheel located diagonally with respect to the center of the vehicle and the corresponding brake actuator unit 20. The second power supply unit 54 accordingly supplies power to the control unit 24, 26 associated with the other front wheel and the corresponding brake actuator unit 20 as well as to the control unit 28, 30 associated with a rear wheel located diagonally with respect to the center of the vehicle and the corresponding brake actuator unit 20.

In other words, the power supply units 52, 54 are connected diagonally.

In the FIGURE, the first and the second power supply unit 52, 54 are shown twice in order to clarify the type of connection.

If one power supply unit fails, it is conceivable that the further power supply unit takes over the power supply of all control units 24, 26, 28, 30 and all brake actuator units 20 at least for a short time.

Of the four control units 24, 26, 28, 30, two control units 24, 26, in particular the control units 24, 26 which are associated with the front wheels, are designed as a master unit.

The two further control units 28, 30, in particular associated with the rear wheels, are each designed as a slave unit.

Each of the master units is directly connected in terms of signaling to one of the control units 28, 30 designed as a slave unit in order to forward the brake signal to the slave unit.

More precisely, each control unit 24, 26 designed as a master unit is in each case directly coupled to the control unit 28, 30 of the rear wheel located diagonally with respect to the center of the vehicle, in particular via signal lines 56, 58.

A brake signal om the brake actuation unit 32 is sent directly to each of the master units.

The slave units receive the brake signal indirectly from the master units.

In order to send the brake signal from the brake actuation unit 32 to the control units 24, 26 designed as a master unit, the master units are each connected in terms of signaling to the brake actuation unit 32 by a separate signal line 60.

In addition, the two control units 24, 26 designed as a master unit are directly interconnected in terms of signaling by a signal line 62.

The two control units 24, 26 designed as a master unit can thus communicate with one another in order to coordinate a brake signal with one another. This can be used to compensate for a possible tendency of the vehicle to turn about its vertical axis, for example by braking the two front wheels with different braking forces.

In the case of communication between the at least two control units 24, 26 designed as a master unit, one of the master units is designed to act as a higher-level master.

Likewise, the two control units 28, 30 designed as a slave unit are directly interconnected in terms of signaling by a signal line 64.

The control units 28, 30 designed as a slave unit can also communicate with one another via the signal line 64 in order to coordinate a brake signal.

When a driver makes a braking request by actuating the brake pedal 34, the corresponding signal is sent separately via the signal lines 60 to the control units 24, 26 designed as a master unit.

The control units 24, 26 designed as a master unit then forward the brake signal via the signal lines 56, 58 to the control units 28, 30 designed as a slave unit, in particular in each case to the control unit 28, 30 of the rear wheel located diagonally with respect to the center of the vehicle.

Each of the control units 24, 26, 28, 30 thus receives a brake signal directly or indirectly and, thereupon, activates the associated brake actuator unit 20.

In the non-disrupted operation, all the brake actuator units 20 are consequently activated so that all wheels 12, 14, 16, 18 can be braked during a braking process.

If one of the control units 28, 30 designed as a slave unit fails, the brake signal is still forwarded directly from the brake actuation unit 32 to the two control units 24, 26 designed as a master unit and indirectly from one of the two control units 24, 26 designed as a master unit to the still functioning slave unit.

Thus, three of the four wheels 12, 14, 16, 18 can still be braked during a braking process. As a result, a braking power of approximately 70% of the brake line of the non-disrupted braking system 10 can be achieved.

If one of the control units 24, 26 designed as a master unit fails, the brake signal is only forwarded directly from the brake actuation unit 32 to the functioning master unit and indirectly from the functioning master unit to one of the two control units 28, 30 designed as a slave unit.

The failed master unit can no longer forward the brake signal to the other of the two control units 28, 30 designed as a slave unit.

Since the control units 28, 30 designed as a slave unit are directly interconnected in terms of signaling, the brake signal can, however, be forwarded to the further slave unit by the slave unit that has received the signal from the master unit.

Thus, even if one control unit 24, 26 designed as a master unit fails, three brake actuator units 20 can still be activated and consequently three of the four wheels 12, 14, 16, 18 can be braked.

In one exemplary arrangement, the control units 24, 26, 28, 30 can each access the control electronics 31 of at least one further control unit 24, 26, 28, 30. Thus, if one control unit 24, 26, 28, 30 fails, provided that the control electronics 31 are still intact, the brake actuator unit 20 associated with the failed control unit 24, 26, 28, 30 can still be activated so that unrestricted braking power is available.

According to a further exemplary arrangement which is not shown for the sake of simplicity, the signaling circuitry can be designed such that each master unit can communicate in terms of signaling with the other control units 28, 30 if the other master unit fails. In this way, a brake signal can be forwarded from one master unit directly to both control units 28, 30 designed as a slave unit.

The invention claimed is:

1. A braking system for a vehicle having at least four brakable wheels, comprising
   at least four brake actuator units, each of which can be associated with one of the wheels of the vehicle,
   wherein each brake actuator unit is associated with an electronic control unit which is designed to activate the brake actuator unit in order to apply a braking force to an associated wheel,
   a first power supply unit and a second power supply unit, the first and second power supply units configured to be switched on independently of one another in order to supply all the control units and brake actuator units with power;
   wherein at least two of the control units are designed as a master unit and a brake signal from a brake actuation unit is sent directly to each of the master units, and
   wherein each master unit is directly connected in terms of signaling to at least another of the control units, designed as a slave unit, in order to forward the brake signal to the slave unit.

2. The braking system according to claim 1, wherein the two control units designed as a slave unit are directly interconnected in terms of signaling.

3. The braking system according to claim 1, wherein the two control units designed as a master unit are directly interconnected in terms of signaling.

4. The braking system according to claim 3, wherein, in the case of communication between the at least two control units designed as a master units, one of the master units is designed to act as a higher-level master.

5. The braking system according to claim 2, wherein the two control units designed as a master unit are directly interconnected in terms of signaling.

6. The braking system according to claim 5, wherein the control units designed as a master unit are each connected in terms of signaling to the brake actuation unit by a separate signal line.

7. The braking system according to claim 5, wherein a rotational speed sensor is associated with each of the wheels and is connected to the control unit associated with the relevant wheel.

8. The braking system according to claim 5, wherein each of the control units comprises control electronics for activating the associated brake actuator unit, with at least one of the control units being able to access the control electronics of at least one further control unit.

9. The braking system according to claim 5, wherein the braking system comprises a bus system, the at least two control units designed as a master unit being connected to the bus system.

10. The braking system according to claim 9, wherein a yaw rate sensor is connected to the bus system.

11. A braking system for a vehicle having at least four brakable wheels, comprising
   at least four brake actuator units, each of which can be associated with one of the wheels of the vehicle,
   wherein each brake actuator unit is associated with an electronic control unit which is designed to activate the brake actuator unit in order to apply a braking force to an associated wheel,
   wherein at least two of the control units are designed as a master unit and a brake signal from a brake actuation unit is sent directly to each of the master units,
   wherein each master unit is directly connected in terms of signaling to at least another of the control units, designed as a slave unit, in order to forward the brake signal to the slave unit;
   wherein each master unit are connected in terms of signaling to the brake actuation unit by a separate signal line; and
   wherein the master units are associated with the front wheels and are each directly coupled to the control unit of the rear wheel located diagonally with respect to the center of the vehicle.

12. The braking system according to claim 11, wherein at least two sensors via which a brake actuation can be detected are provided on the brake actuation unit and each of the sensors is directly connected in terms of signaling to a master unit.

13. The braking system according to claim 11, wherein a rotational speed sensor is associated with each of the wheels and is connected to the control unit associated with the relevant wheel.

14. The braking system according to claim 11, wherein each of the control units comprises control electronics for activating the associated brake actuator unit, with at least one of the control units being able to access the control electronics of at least one further control unit.

15. The braking system according to claim 11, wherein the braking system comprises a bus system, the at least two control units designed as a master unit being connected to the bus system.

16. The braking system according to claim 15, wherein the braking system comprises an electronic parking brake which has a parking brake actuation unit and is connected to the bus system.

17. The braking system according to claim 15 wherein a yaw rate sensor is connected to the bus system.

18. The braking system according to claim 11, wherein the signaling circuitry is designed such that each master unit can communicate in terms of signaling with the other control units if the other master unit fails.

* * * * *